US010998818B2

(12) United States Patent
Kesterson et al.

(10) Patent No.: US 10,998,818 B2
(45) Date of Patent: May 4, 2021

(54) ASYNCHRONOUS DROPOUT TRANSITION FOR MULTI-LEVEL AND SINGLE-LEVEL BUCK CONVERTERS

(71) Applicant: DIALOG SEMICONDUCTOR (UK) LIMITED, London (GB)

(72) Inventors: John Kesterson, Chandler, AZ (US); Aravind Mangudi, Chandler, AZ (US); James Steele, Chandler, AZ (US); Mark Mercer, Chandler, AZ (US)

(73) Assignee: Dialog Semiconductor (UK) Limited, London (GB)

( * ) Notice: Subject to any disclaimer, the term of this patent is extended or adjusted under 35 U.S.C. 154(b) by 51 days.

(21) Appl. No.: 16/533,691

(22) Filed: Aug. 6, 2019

(65) Prior Publication Data

US 2021/0044204 A1 Feb. 11, 2021

(51) Int. Cl.

*H02M 3/158* (2006.01)
*H02M 1/00* (2006.01)

(52) U.S. Cl.

CPC ............. *H02M 3/158* (2013.01); *H02M 1/00* (2013.01); *H02M 2001/0041* (2013.01)

(58) Field of Classification Search

CPC ......... H02M 3/155–1588; H02M 1/00; H02M 2001/0041

See application file for complete search history.

(56) References Cited

U.S. PATENT DOCUMENTS

| | | | | |
|---|---|---|---|---|
| 9,929,653 | B1 * | 3/2018 | Mercer | H02M 1/08 |
| 10,090,763 | B1 * | 10/2018 | Mercer | H02M 3/1582 |
| 10,218,254 | B1 * | 2/2019 | Neyra | H02M 3/158 |
| 10,720,839 | B1 * | 7/2020 | Yamada | H02M 1/0061 |
| 2004/0174152 | A1 * | 9/2004 | Hwang | H02M 3/158 323/284 |
| 2009/0200995 | A1 * | 8/2009 | Tran | H02M 3/1582 323/222 |
| 2011/0148372 | A1 * | 6/2011 | Mariani | H02M 3/156 323/272 |
| 2012/0105038 | A1 | 5/2012 | Chen et al. | |
| 2013/0342183 | A1 | 12/2013 | Fang et al. | |
| 2014/0266117 | A1 * | 9/2014 | Goncalves | H02M 3/155 323/283 |
| 2019/0081546 | A1 * | 3/2019 | Hsu | H02M 3/158 |
| 2019/0190381 | A1 * | 6/2019 | Chesneau | H02M 3/1563 |
| 2020/0274445 | A1 * | 8/2020 | Mei | H03K 5/24 |

OTHER PUBLICATIONS

Office Action issued by the German Patent and Trademark Office (GPTO), German patent application 102019219962.3, dated Mar. 24, 2021, 4 pages.

* cited by examiner

*Primary Examiner* — Fred E Finch, III
(74) *Attorney, Agent, or Firm* — Haynes and Boone, LLP

(57) ABSTRACT

A multi-level buck converter is provided with seamless transitions back and forth from synchronous to asynchronous low dropout modes of operation.

20 Claims, 6 Drawing Sheets

ASYNCHRONOUS DROPOUT TRANSITION FOR MULTI-LEVEL AND SINGLE-LEVEL BUCK CONVERTERS

TECHNICAL FIELD

The present invention relates to buck converters, and more particularly to the transition between synchronous and asynchronous modes for multi-level and single-level buck converters.

BACKGROUND

The ratio of the output voltage to the input voltage defines the duty cycle for buck converters. As the duty cycle approaches one, it is conventional for a buck converter (whether multi-level or single-level) to transition from a synchronous mode of operation to an asynchronous mode of operation. In a synchronous mode of operation, the cycling on of the power switch(es) is synchronous with a system clock signal. But the on-time for a switching state is followed by a minimum off-time for that switching state. During low dropout operation in which the input voltage is only slightly higher than the output voltage, synchronous operation is constrained by the minimum off-time from pushing the duty cycle towards 100%. The maximum switching state on-time established by the system clock signal minus the minimum off-time limits the achievable duty cycle during synchronous operation.

To increase the duty cycle for low dropout operation, it is conventional to transition the buck converter into an asynchronous mode of operation in which the switching states are not switched on synchronously with the system clock signal. The on-time for a switching state may thus increase as it is no longer tethered to the system clock signal period. The achievable duty cycle can thus be increased through asynchronous operation.

Although asynchronous operation is thus advantageous, the buck converter must transition back into synchronous operation as the duty cycle lowers. Conventional transition into synchronous operation from asynchronous operation causes a relatively large perturbation in the output voltage and in the inductor current. Accordingly, there is a need in the art for buck converters with improved transitions between asynchronous and synchronous operation.

SUMMARY

In the following summary, the term "buck converter" includes in its scope both a multi-level buck converter and a single-level buck converter. With that understanding in mind, a buck converter is disclosed that includes: a first ramp signal generator configured to generate a first ramp signal responsive to a clock signal during a synchronous mode of operation and responsive to an asynchronous triggering signal during an asynchronous mode of operation; a cycle timer configured to time a cycle timer period responsive to the asynchronous triggering signal, wherein the cycle timer period is less than or greater than a clock signal period for the clock signal; a first comparator configured to compare the first ramp signal to an error signal to assert a first control signal responsive to the first ramp signal rising to equal to the error signal; and a switch controller configured to determine if the first control signal is asserted prior to an expiration of the cycle timer period plus a minimum off-time period during the asynchronous mode of operation, and wherein the switch controller is further configured to transition to the synchronous mode of operation responsive to the expiration of the cycle timer period being sufficiently synchronous with the clock signal following a determination that the first control signal was asserted prior to an expiration of the cycle timer period plus a minimum off-time period.

In addition, a method of operating a buck converter is provided. The method includes the acts of during a synchronous mode of operation, generating a first ramp signal responsive to a clock signal; during an asynchronous mode of operation, generating the first ramp signal responsive to an asynchronous triggering signal; asserting a first control signal responsive to the first ramp signal rising to equal an error signal; timing a cycle timer period responsive to the asynchronous triggering signal, wherein the cycle timer period is shorter than or greater than a clock signal period for the clock signal; during the asynchronous mode of operation, determining if first control signal was asserted prior to an expiration of the cycle timer period and an expiration of a minimum off-time period; if the first control signal was asserted prior to the expiration of the cycle timer period and the expiration of the minimum off-time period, determining if a subsequent expiration of the cycle timer period is sufficiently synchronous with the clock signal; and transitioning from the asynchronous mode of operation to the synchronous mode of operation responsive to the determination that the cycle timer period is sufficiently synchronous with the clock signal.

These and additional advantageous features for the disclosed multi-level buck converters may be better appreciated through consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
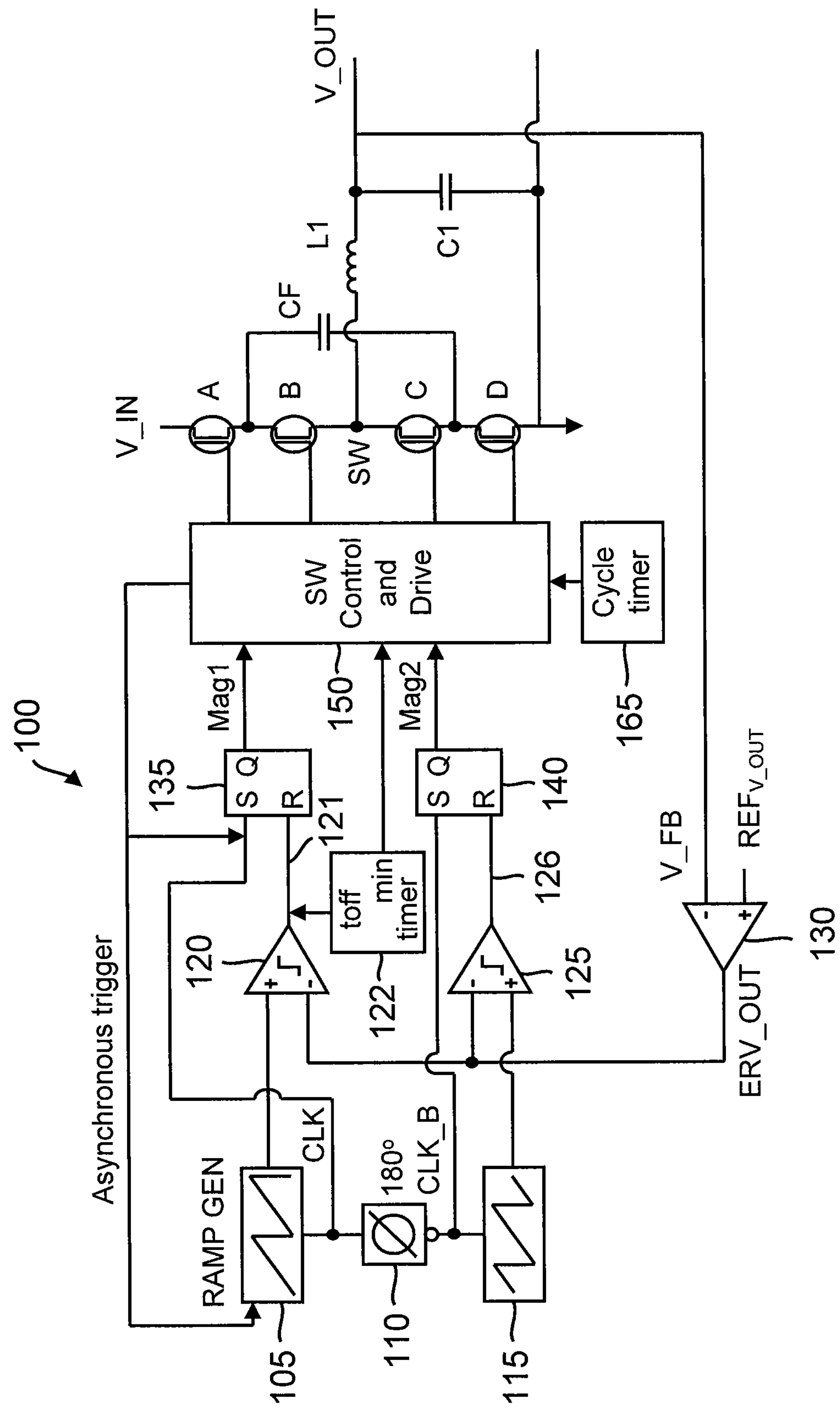
FIG. 1 illustrates a multi-level buck converter configured to transition between synchronous and asynchronous modes during low dropout operation in accordance with as aspect of the disclosure.

An improved multi-level buck converter is provided that seamlessly regulates output power in transitions between synchronous and asynchronous modes of operation. An example multi-level buck converter 100 for such seamless regulation is shown in FIG. 1 that includes switch transistors A, B, C, and D arranged in a conventional fashion. In particular, switch transistor A has a first terminal connected to a node for an input voltage V_IN and a second terminal connected to a first terminal for a flying capacitor CF. In addition, the second terminal for switch transistor A connects to a first terminal for switch transistor B. As used herein, a transistor "terminal" refers to, for example, a drain or source terminal for a MOS field-effect-transistor. A second terminal for switch transistor B connects to a switch (SW) terminal for an inductor L1 that connects to an output capacitor C1 for smoothing an output voltage V_OUT. Switch transistor C has a first terminal connected to the SW node (the input node for inductor L1) and a second terminal connected to a remaining terminal for the flying capacitor CF. In addition, the second terminal for switch transistor C connects to a first terminal of switch transistor D that in turn has a second terminal connected to ground.

An error amplifier 130 generates an error signal voltage (ER V_OUT) responsive to a difference between the output voltage and a reference voltage ($REF_{V\_OUT}$). The error signal is compared to two ramp signals that are 180° out of phase with each other (note that other phase relationships may be used in alternative embodiments). A first ramp generator 105 generates a first ramp signal responsive to a clock signal (CLK) from a clock source 110. A second ramp generator 115 generates a second ramp signal responsive to an inverted clock signal (CKL_B) from clock source 110. The second ramp signal is thus 180° out of phase with the first ramp signal. A first comparator 120 compares the first ramp signal to the error signal to generate a first control signal 121. Similarly, a second comparator 125 compares the second ramp signal to the error signal to generate a second control signal 126.

During synchronous operation in which the error signal is not too large, a rising edge for the clock signal CLK sets a reset-set (RS) latch 135 to assert a first magnetizing signal (MAG1). The rising edge for the clock signal CLK also triggers first ramp generator 105 to begin ramping the first ramp signal. Once the first ramp signal rises to equal the error voltage, first control signal 121 resets RS latch 135 to reset (discharge) the first magnetizing signal. In synchronous operation, a rising edge for the complement clock signal CLK_B sets an RS latch 140 to assert a second magnetizing signal (MAG2). The rising edge for the complement clock signal also triggers second ramp generator 115 to begin ramping the second ramp signal. Once the second ramp signal rises to equal the error voltage, second control signal 126 resets RS latch 140 to reset (discharge) the second magnetizing signal.

Figure 2:
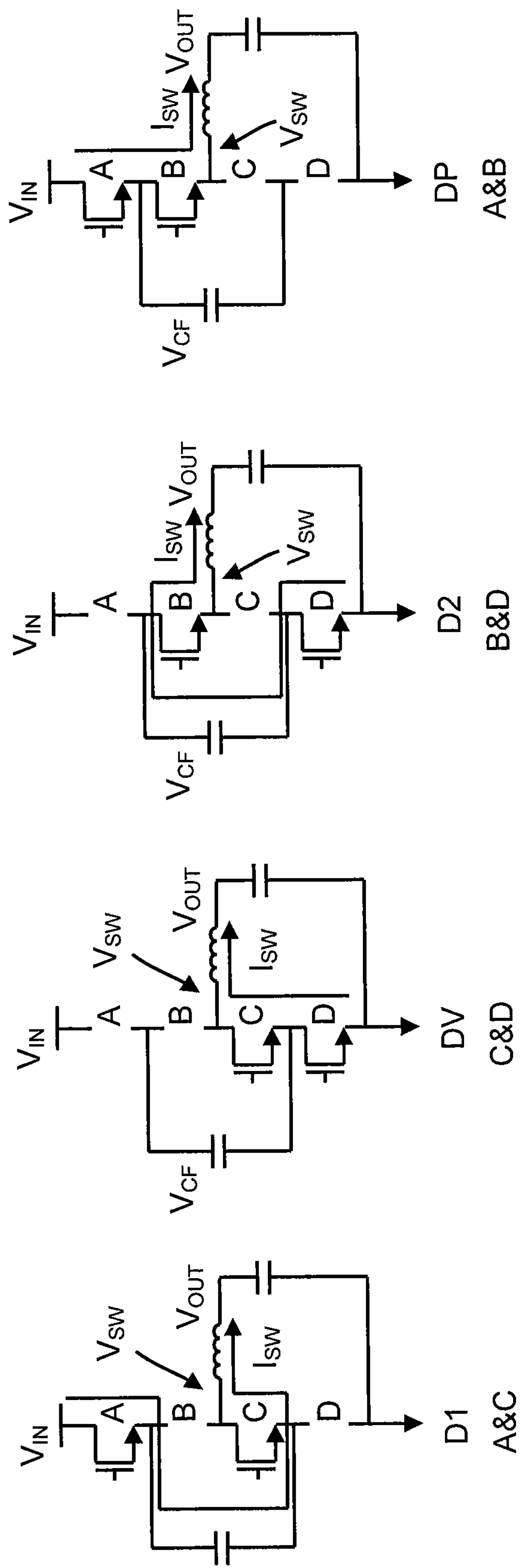
FIG. 2 illustrates the four switching states for the multi-level buck converter of FIG. 1.

A switch controller and drive circuit 150 processes the first and second magnetizing signals to determine the switching states during synchronous operation. For brevity, switch controller and drive circuit 150 is referred to simply as a switch controller 150 in the following discussion. Switch transistors A, B, C, and D may be configured into one of four switching states designated herein as a D1 switching state, a D2 switching state, a DV switching state, and a DP switching state as shown in FIG. 2. Switch transistors A and C are on and switch transistors B and D are off in switching state D1. In switching state DV, only switch transistors C and D are on. In switching state D2, it is just switch transistors B and D that are on. Finally, it is just switch transistors A and B that are on in switching state DP. During synchronous operation, switch controller 150 processes the first and second magnetizing signals as shown in the following table 1 to select for the D1, D2, DV, and DP switching states:

TABLE 1

| Switching State | First magnetizing signal | Second magnetizing signal |
|---|---|---|
| D1 | ON | OFF |
| D2 | OFF | ON |
| DV | OFF | OFF |
| DP | ON | ON |

As can be seen from Table 1, switching state D1 is selected during synchronous operation when the first magnetizing signal is asserted to a binary one state while the second magnetizing signal is reset. Switching state D2 is the complement of switching state D1 such that it is selected for when the first magnetizing signal is reset and the second magnetizing signal is set. If both magnetizing signals are reset, it is the DV switching state that is selected. Finally, if both magnetizing signals are set, it is the DP switching state that is selected.

Synchronous operation depends upon the duty cycle, which in turn determines whether the error signal is less than 50% or greater than 50% of a mid-point of the peak voltage for the two ramp signals (one-half of the peak voltage). As the error signal rises, the on-time for the D1 switching state approaches the period for the clock signal. But there is a minimum off-time that prevents the first magnetizing signal from having an on-time that equals the clock period. Should the on-time for first control signal 121 from comparator 120 exceed the clock signal period minus the minimum off-time, first control signal 121 is reset even through the first ramp signal has not yet risen to equal the error signal. A minimum off-time timer 122 times the minimum off-time period. For example, minimum off-time timer 122 may be formed by shifting the clock signal by the minimum off-time period. In such an embodiment, minimum off-time timer 122 would assert the shifted clock signal at the beginning of the minimum off-time period prior to the assertion of the clock signal.

Switch controller 150 monitors whether the first magnetizing signal had to be reset due to the minimum off-time requirement to determine whether to transition from synchronous operation to an asynchronous mode of operation in which there is a relatively small dropout between the input voltage and the output voltage. In one embodiment, switch controller 150 counts whether the number of consecutive cycles for the clock signal in which the first magnetizing signal was reset due to the minimum off-time requirement. For example, switch controller 150 may transition to an asynchronous mode of operation when the count equals four. Note that the count of four is arbitrary and may be varied in alternative embodiments. Moreover, the count may be reset should no forced termination occur to the first magnetization signal due to the minimum off-time requirement. Alternatively, the count may be decremented is there is no forced termination.

Regardless of how the transition to asynchronous mode is triggered, the beginning of the on-time for the magnetization signals is no longer synchronous with the clock signals. During asynchronous operation, switch controller 150 asserts an asynchronous trigger signal to trigger first ramp generator to begin ramping the first ramp signal and to set RS latch 135 to set the first magnetizing signal. The first magnetizing signal is reset during asynchronous mode only when the first ramp signal has risen to equal the error signal even though the resulting on-time for the first magnetization signal may exceed the clock signal period. Once the first magnetizing signal is reset, it is maintained off for the minimum off-time and then the first ramp signal is triggered by the asynchronous trigger signal to begin ramping again while the first magnetizing signal is set. Both the first ramping signal and the first magnetizing signal are thus untethered from the clock signal during asynchronous operation. Assertion and de-assertion of the second magnetizing signal is analogous during asynchronous mode as will be explained further herein.

Asynchronous operation thus allows the first magnetizing signal to have an on-time that is sufficiently long so that the output voltage can be maintained at a desired level despite there being a relatively small dropout between the output voltage and the input voltage. But once the duty cycle begins to fall, switch controller 150 must transition back into synchronous operation. A conventional transition from asynchronous to synchronous operation typically results in a significant perturbation of the output voltage. To prevent this perturbation and maintain regulation of the output voltage during the transition, switch controller 150 uses a cycle timer 165 that times a cycle timer period that is shorter that the clock signal period. In alternative embodiments, the cycle timer period may be greater than the clock signal period. Each time the first ramp signal and the first magnetization signal are asserted during the asynchronous operation, cycle timer 165 begins timing the cycle timer period. When the first ramp signal equals the error signal, the first magnetization signal is reset for the minimum off-time period. At the expiration of the minimum off-time period, switch controller 150 tests whether the cycle timer period has expired. If the cycle timer period has expired, switch controller 150 begins another asynchronous cycle for the first ramp signal and the first magnetization signal. But if the cycle timer has not expired, switch controller 150 waits until the cycle timer has expired. At this expiration of the cycle timer period, switch controller 150 tests whether the expiration of the cycle timer period is sufficiently synchronous with the next rising edge of the clock signal. For example, such a test may consist of determining whether the cycle timer period expires during an on-time for the clock signal. If the expiration of the cycle timer period is sufficiently synchronous with the clock signal, switch controller 150 switches to synchronous operation. If the expiration of the cycle timer period is not sufficiently synchronous with the clock signal, switch controller 150 initiates another asynchronous cycle (denoted herein as a precess cycle) for the ramp signal and the first magnetization signal.

Suppose that the cycle timer has not expired during an asynchronous cycle after the expiration of the minimum off-time and that the subsequent expiration of the cycle timer is not sufficiently synchronous with the clock signal. The period for the asynchronous cycle will then be equal to the cycle timer period since a new asynchronous cycle will begin upon the expiration of the cycle timer. If successive asynchronous cycles are also limited by the cycle timer, the beginning of these successive asynchronous cycles will necessarily "precess" with regard to the rising edge of the clock signal until a final one of the successive asynchronous cycles is sufficiently synchronous with the clock signal. Although this is not a precession as that term in used to describe rotating bodies in physics, it is used herein to denote how the phase angles of the cycle timer and the clock signal will rotate with respect to each other until these two clock signals are sufficiently aligned with each other. This rotation will occur so long as the cycle timer period is either shorter or longer than the clock signal period. Note that as the difference between the cycle timer period and the clock signal period is increased, the rotation speed between the two clock signals increases. If the difference is too large, it may be difficult to detect when the two clock signals are sufficiently aligned. Conversely, if the difference is too small, it will be easier to detect when the clock signals are sufficiently aligned but there may be considerable latency before this alignment is achieved. The selection of the difference between the cycle timer period and the clock signal period is thus a design choice that balances latency and ease of detecting when the two signals are sufficiently synchronous.

Figure 3:
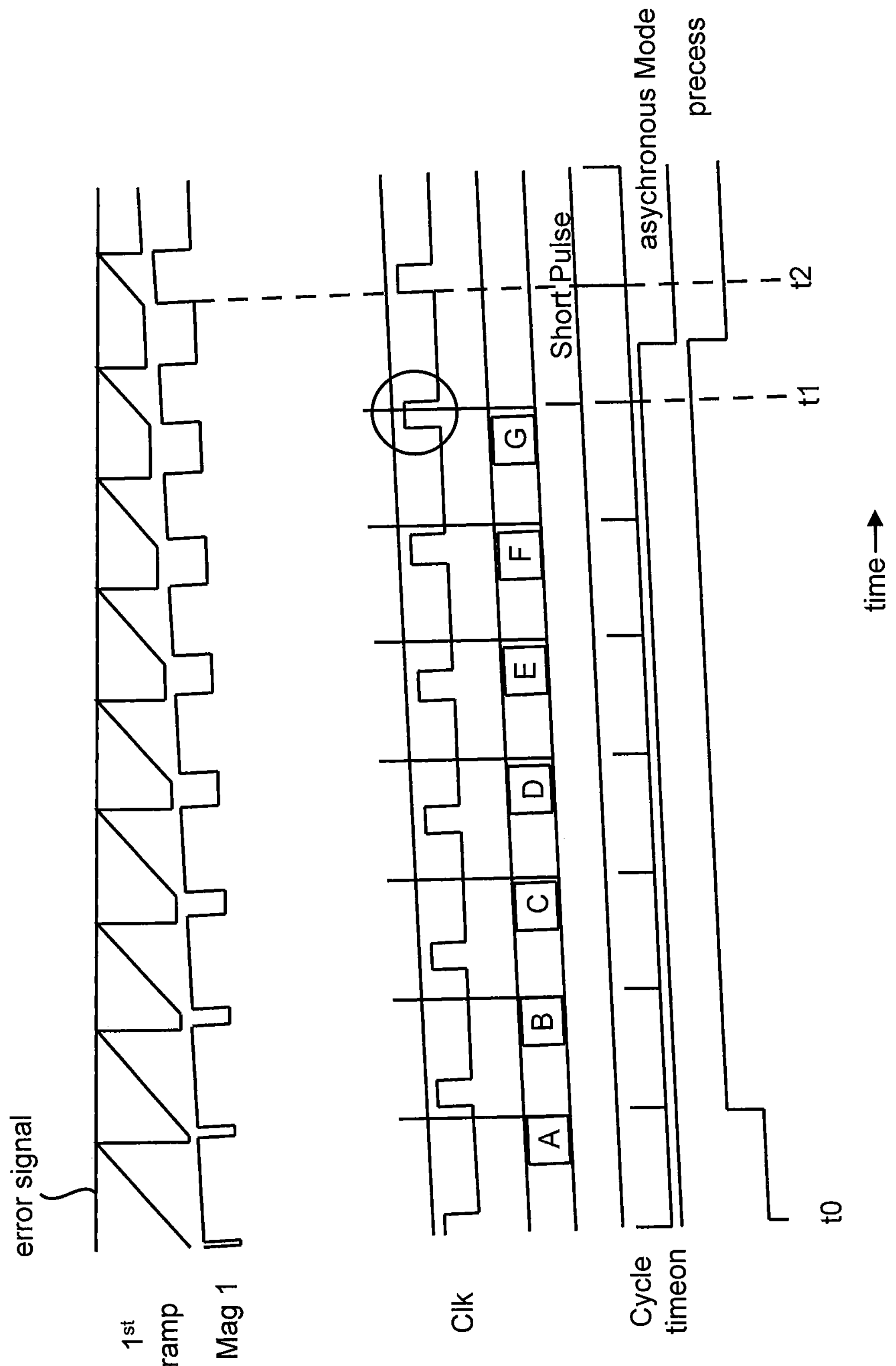
FIG. 3 is a timing diagram for various control signals in the multi-level buck converter of FIG. 1 during a transition from asynchronous to synchronous modes during low dropout operation.

The precession between the cycle timer and the clock signal may be better appreciated with regard to the timing diagram shown in FIG. 3. At a time t0, the first ramp signal begins another asynchronous cycle at the expiration of the minimum off-time. The first magnetization signal (mag 1) is thus reset for the minimum off-time at time t0 before being set because the cycle timer had not expired at time t0. At the successive asynchronous cycle A, the cycle timer has expired at the expiration of the minimum-off time after the first ramp signal equals the error signal. A precession signal is thus asserted to denote that the precess transition into synchronous mode has started by testing whether the expiration of the cycle timer has occurred during the on-time for the clock signal CLK. In asynchronous cycle A, the cycle timer expires before the on-time of the current clock signal period. The precession will thus continue through successive asynchronous cycles B, C, D, E, and F. As can be seen for these asynchronous cycles, the expiration of the cycle timer becomes successively closer to the on-time for the clock signal due to the relative phase rotation between the cycle timer and the clock signal. Thus, at a final asynchronous cycle G, the cycle timer expires at a time t1 during the on-time for the clock signal such that the asynchronous mode is terminated. In particular, a short pulse signal is asserted at time t1 to indicate that the cycle timer expired during the on-time for the clock signal to detect the end of the asynchronous mode. A synchronous cycle thus begins at time t1 that is sufficiently synchronous with the rising edge of the clock signal. This synchronization becomes exact at a time t2 in which the second synchronous cycle begins synchronously with the rising edge of the clock signal. In each synchronous cycle, the first magnetization signal and the first ramp signal are asserted synchronously with the clock signal. The first magnetization signal is then reset when the first ramp signal equals the error signal and not set again until the next rising edge of the clock signal.

Figure 4:
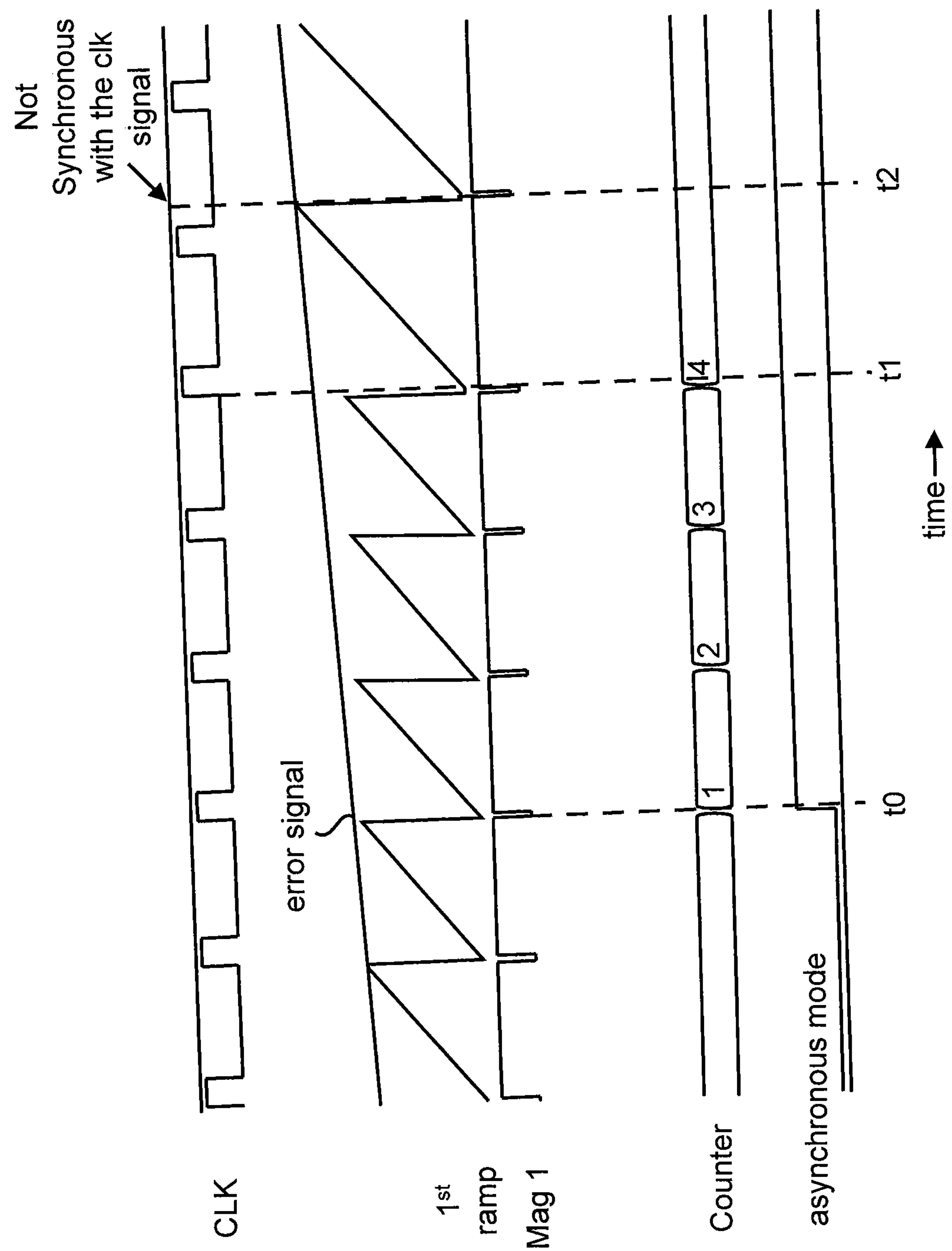
FIG. 4 is a timing diagram for various control signals in the multi-level buck converter of FIG. 1 during a transition from synchronous to asynchronous modes during low dropout operation.

Entry into asynchronous mode may be better appreciated with regard to the timing diagram of FIG. 4. At a time t0, a synchronous cycle of the first ramp signal and the first magnetization signal is terminated due to the on-time for the first magnetization signal exceeding the maximum allowed on-time of the clock signal period minus the minimum off-time. The counter is thus incremented due to this minimum-off-time-initiated termination of a synchronous cycle. The asynchronous mode signal is thus asserted since the counter was incremented. This first minimum-off-time-terminated synchronous cycle is followed by three more minimum-off-time-terminated synchronous cycles such that the count is incremented to four at a time t1 that begins the fourth minimum-off-time-terminated synchronous cycle. The asynchronous mode is thus asserted such that the next cycle at a time t2 begins when the ramp signal equals the error signal and after the minimum off-time period has expired even though the delay between times t2 and t1 for this initial asynchronous cycle exceeds the clock period. The asynchronous cycle beginning at time t2 is thus not synchronous with the rising edge of the clock signal but instead occurs after the on-time for the clock signal has already terminated.

Figure 5:
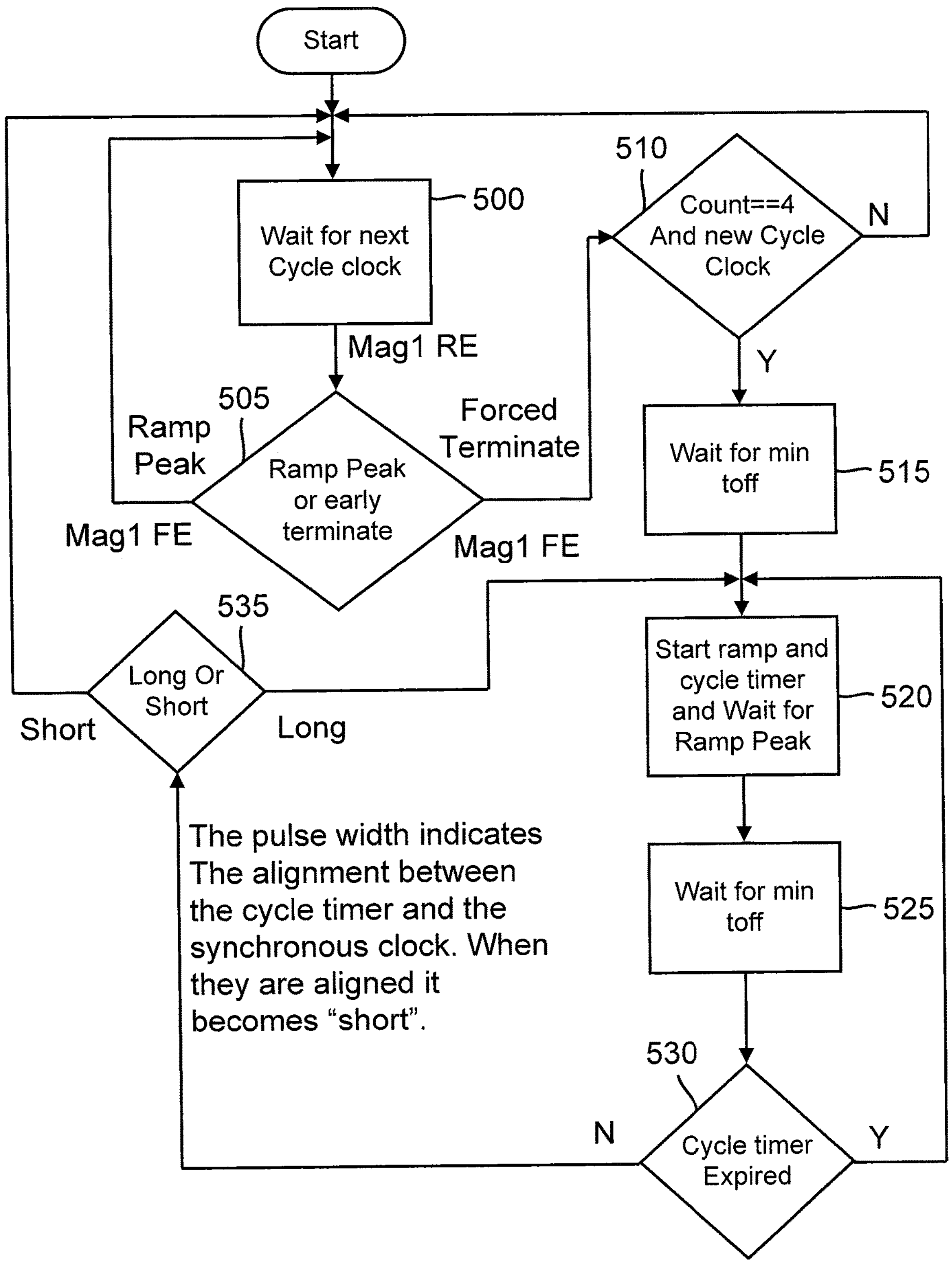
FIG. 5 is a flowchart for a method of transitioning between synchronous and asynchronous low dropout modes of operation for a multi-level (or single-level) buck converter in accordance with an aspect of the disclosure.

The resulting transition into asynchronous mode and back into synchronous mode during low dropout operation as implemented by switch controller 150 is summarized in the flowchart shown in FIG. 5. It will be appreciated, however, that the method shown in FIG. 5 is applicable to single-level buck converters as well since this method is directed to the use of just the first magnetizing signal. As will be explained further herein, a single-level buck converter uses the first magnetizing signal but does not use a second magnetizing signal. The method begins with an act 500 of waiting for a new clock cycle for the clock signal during synchronous operation. As discussed with regard to FIG. 4, the assertion of the first ramp signal and the first magnetizing signal is synchronous with the rising edge of the clock signal but it may be made synchronous with the falling edge of the clock signal in alternative embodiments. Regardless of the triggering edge (rising or falling), the first magnetizing signal is asserted with the triggering edge of the new clock cycle in act 500. This rising edge of the first magnetizing signal is summarized in FIG. 5 as “Mag 1 RE.” At the same time, the first ramp signal is also initiated. Whether the first ramp signal has risen to equal the error signal prior to a minimum-off-time-initiated reset of the first magnetizing signal is determined in an act 505. If the first ramp signal rises to equal the error signal prior to a minimum-off-time-initiated reset of the first magnetizing signal, the first magnetizing signal is reset (Mag 1 FE) so that a new synchronous cycle may be initiated again in act 500.

However, if the first ramp signal does not rise to equal the error signal prior to a minimum-off-time-initiated reset of the first magnetizing signal, the process continues with an act 510 of incrementing the count and testing whether the resulting increment of the count equals four in an act 510. If the count is less than four, another synchronous cycle is initiated in act 500. Conversely, if the count equals four (or more generally, a threshold count), the minimum off-time (min toff) is allowed to expire in an act 515 before an asynchronous cycle begins in an act 520. In the asynchronous cycle, both the first ramp signal and the first magnetizing signal are set independently of the clock signal. At the same time, the cycle timer begins timing. Act 520 terminates when the first ramp signal equals the error signal, whereupon the first magnetizing signal is reset. After the minimum off-time expires in an act 525 following the reset of the first magnetizing signal, an act 530 determines whether the cycle timer has also expired.

If the determination in act 530 is positive, another asynchronous cycle is initiated starting with act 520. However, if the cycle timer had expired, a pulse is generated in an act 535 that has either a long or short pulse width. A long pulse width indicates that the alignment between the cycle timer expiration and the clock signal is not sufficiently synchronous. For example, a long pulse width may be generated in act 535 if the cycle timer expires while the clock signal is reset. In that case, another asynchronous cycle begins in act 520 with the first ramp signal and the first magnetizing signal being set responsive to the expiration of the cycle timer period. However, if the cycle timer is sufficiently aligned with the clock signal in act 535, a short pulse is generated to indicate the return to synchronous operation. For example, the short pulse may be generated in act 535 if the cycle timer period expires during the on-time of the clock signal. In that case, a synchronous cycle is initiated by returning to act 500. It will be appreciated that other types of signals besides a relatively short or long pulse width may be used to signify the result of the act 535 determination of whether the cycle timer period expiration is sufficiently synchronous with the clock signal.

The duty cycle of the clock signal determines the accuracy of the determination of whether the cycle timer is sufficiently aligned with the clock signal in act 535. Note that if the duty cycle is too large (e.g., 50%), the cycle timer may be relatively asynchronous with the clock signal yet the cycle timer period will expire during the on-time for the clock signal. On the other hand, if the duty cycle is too small, it will take a relatively long time for the precession to proceed until the cycle timer period expires during the relatively brief on-time for the clock signal. The selection of the duty cycle for the clock signal (the percentage of the clock signal period occupied by the on-time) is thus a design choice that will balance the precision demanded for synchronicity between the cycle timer and the clock signal and the difficulty of achieving such precision. For example, the duty cycle for the clock signal is plainly less than 50% as shown in FIGS. 3 and 4. But this duty cycle is not too small either, for example, the duty cycle for the clock signal is approximately 20% in FIG. 4.

Referring again to Table 1, note that the same control for selecting between the switching states is applied during asynchronous operation and during synchronous operation. There must thus be an assertion of a second ramp signal and a second magnetizing signal following every assertion of the first ramp signal and the first magnetizing signal. During synchronous operation, the assertion of the second ramp signal and the second magnetizing signal are both kept 180 degrees out of phase with the assertion of the first ramp signal and the second ramp signal since the complement clock signal (CLK_B) is 180 degrees out of phase with the first clock signal. But the generation of the first and second ramp signal as well as the first and second magnetizing signals are decoupled from the corresponding clock signal and its complement during asynchronous operation. To keep the signals 180 degrees out of phase, a third ramp signal is used during asynchronous mode that is asserted when the first ramp signal is asserted. However, the third ramp signal has twice the slope of the first ramp signal. For a static error signal, the third ramp signal will thus equal the error signal at one-half of the period for the first ramp signal. In reality, the error signal may have some deviation over this relatively short half period but the resulting deviation from 180 degrees for the first and second ramp signals is insignificant. Once the third ramp signal has equaled the error signal during asynchronous operation prior to the precession of the cycle timer, the minimum off-time period is timed. The second ramp signal and the second magnetizing signal are then asserted in response to the assertion of a corresponding asynchronous trigger signal after the minimum off-time period has expired. For illustration clarity, both the triggering of second ramp generation 115 and the setting of RS latch 140 to set the second magnetizing signal during asynchronous operation is not shown in FIG. 1. Note that the second ramp signal and the second magnetizing signal may have already been terminated (reset) prior to the expiration of the minimum off-time period following the third ramp signal equaling the error signal. This prior reset of the second ramp signal and the second magnetizing signal would occur because the second ramp signal had risen to equal the error signal prior to the expiration of the minimum off-time following the third ramp signal rising to equal the error signal. If, however, the second ramp signal and the second magnetizing signal had not already been reset, they would be at the expiration of the minimum off-time following the third ramp signal rising to equal the error signal so that a new cycle could begin for the second ramp signal and the second magnetizing signal.

During precess operation, the second ramp signal and the second magnetizing signal are set according to a one-half cycle timer period that is one-half of the cycle timer period. The one-half cycle timer period is started with the start of the cycle timer period. The one-half cycle timer period will thus expire at the half-way point through an asynchronous cycle of the first ramp signal and the first magnetizing signal during precess operation. Once the one-half cycle timer period expires, the second ramp signal and the second magnetizing signal are set following the expiration of the minimum off-time period. In this fashion, the second ramp signal and the second magnetizing signal are kept substantially 180 degrees out of phase with the first ramp signal and the first magnetizing signal during both asynchronous operation and during the precess transition period.

Figure 6:
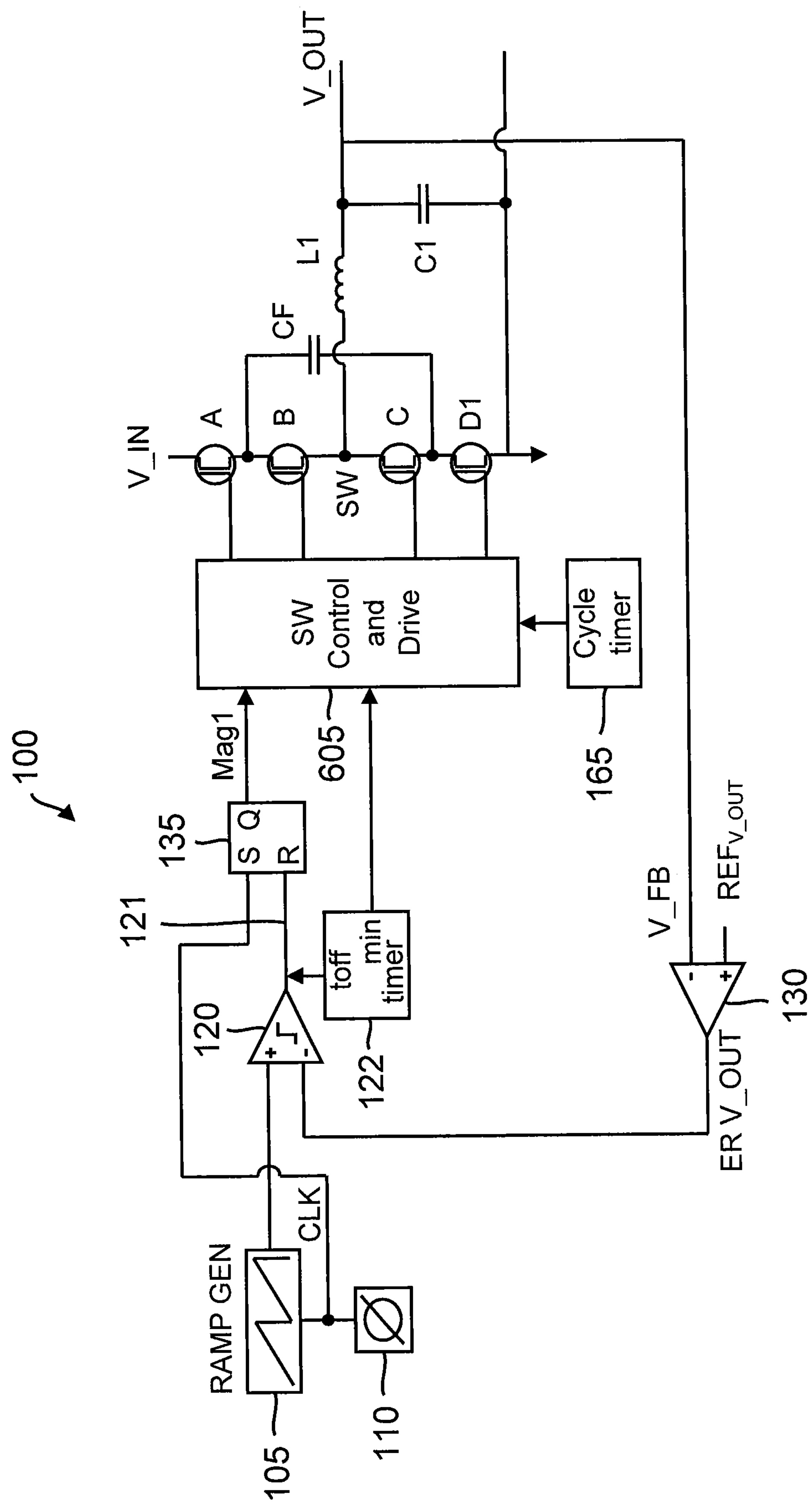
FIG. 6 illustrates a single-level buck converter configured to transition between synchronous and asynchronous modes during low dropout operation in accordance with as aspect of the disclosure.

Note that the first magnetizing signal and the first ramp signal are also present in a single-level buck converter. An example single-level buck converter 600 is shown in FIG. 6. Error amplifier 130, first ramp generator 105, clock source 110, first comparator 120, minimum off-time timer 122, cycle timer 165, and RS latch 135 function as discussed with regard to multi-level buck converter 100. The resulting magnetizing signal is designated as a first magnetizing signal (Mag 1) for buck converter 600 but note that there is no second ramp signal, no second magnetizing signal, nor is there a complement clock signal necessary. A switch controller 605 responds to the first magnetizing signal as discussed with regard to the flowchart of FIG. 5 to control the magnetization period during which switch controller 605 switches on a power switch transistor A to couple an input voltage to a buck inductor L1 that produces an output voltage as stabilized by an output capacitor C1. When the magnetization period ends, a diode D1 becomes forward biased to allow the buck inductor L1 to freewheel. In alternative embodiments, diode D1 may be replaced by a synchronous freewheel switch that would also be controlled by controller 605. Since the transitions between synchronous and asynchronous modes are controlled by the first magnetization signal, operation of single-level buck converter with respect to these transitions is as discussed with regard to multi-level buck converter 100. In addition, there is no added complication of maintaining the (non-existent) second ramp signal 180 degrees out of phase with the first ramp signal during asynchronous operation for single-level buck converter 600 as compared to multi-level buck converter 100.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A buck converter, comprising:

a first ramp signal generator configured to generate a first ramp signal responsive to a clock signal during a synchronous mode of operation and responsive to an asynchronous triggering signal during an asynchronous mode of operation;

a cycle timer configured to time a cycle timer period responsive to the asynchronous triggering signal, wherein the cycle timer period is less than or greater than a clock signal period for the clock signal;

a first comparator configured to compare the first ramp signal to an error signal to assert a first control signal responsive to the first ramp signal rising to equal to the error signal; and a switch controller configured to determine if the first control signal is asserted prior to an expiration of the cycle timer period plus a minimum off-time period during the asynchronous mode of operation, and wherein the switch controller is further configured to transition to the synchronous mode of operation responsive to the expiration of the cycle timer period being sufficiently synchronous with the clock signal following a determination that the first control signal was asserted prior to an expiration of the cycle timer period plus a minimum off-time period.

2. The buck converter of claim 1, wherein the switch controller is further configured to determine if the expiration of the cycle timer period was sufficiently synchronous with the clock signal by a determination of whether the expiration of the cycle timer period occurred during an on-time for the clock signal.

3. The buck converter of claim 2, wherein a duty cycle for the clock signal is less than 50%.

4. The buck converter of claim 3, wherein the duty cycle for the clock signal is approximately 20%.

5. The buck converter of claim 1, wherein the buck converter comprises a single-level buck converter.

6. The buck converter of claim 1, wherein the buck converter comprises a multi-level buck converter.

7. The multi-level buck converter of claim 6, wherein the switch controller is further configured to control a transition from the synchronous mode of operation to the asynchronous mode of operation responsive to a count of synchronous cycles that are terminated responsive to the minimum-off-time period.

8. The multi-level buck converter of claim 7, wherein the switch controller is further configured to control the transition from the synchronous mode of operation to the asynchronous mode of operation responsive to the count exceeding a threshold count.

9. The multi-level buck converter of claim 8, wherein the switch controller is further configured to reset the count responsive to a synchronous switching cycle not being terminated responsive to the minimum off-time period.

10. The multi-level buck converter of claim 8, wherein the threshold count is four.

11. The multi-level buck converter of claim 8, wherein the switch controller is further configured to decrement the count responsive to a synchronous switching cycle not being terminated responsive to the minimum off-time period.

12. A method of controlling a buck converter, comprising:

during a synchronous mode of operation, generating a first ramp signal responsive to a clock signal;

during an asynchronous mode of operation, generating the first ramp signal responsive to an asynchronous triggering signal;

asserting a first control signal responsive to the first ramp signal rising to equal an error signal;

timing a cycle timer period responsive to the asynchronous triggering signal, wherein the cycle timer period is shorter than or greater than a clock signal period for the clock signal;

during the asynchronous mode of operation, determining if the first control signal was asserted prior to an expiration of the cycle timer period and an expiration of a minimum off-time period;

if the first control signal was asserted prior to the expiration of the cycle timer period and the expiration of the minimum off-time period, determining if a subsequent expiration of the cycle timer period is sufficiently synchronous with the clock signal; and transitioning from the asynchronous mode of operation to the synchronous mode of operation responsive to a determination that the subsequent expiration of the cycle timer period is sufficiently synchronous with the clock signal.

13. The method of claim 12, further comprising determining that the subsequent expiration of the cycle timer period is sufficiently synchronous with the clock signal by determining whether the subsequent expiration of the cycle timer period occurs during an on-time for the clock signal.

14. The method of claim 13, wherein a duty cycle of the clock signal is less than 50%.

15. The method of claim 14, wherein the duty cycle of the clock signal is approximately 20%.

16. The method of claim 12, further comprising:

asserting a first magnetization signal responsive to the first ramp signal beginning a ramp signal period; and de-asserting the first magnetization signal responsive to the assertion of the first control signal.

17. The method of claim 16, wherein the buck converter is a multi-level buck converter, the method further comprising:

during the asynchronous mode of operation, asserting a third ramp signal having a slope that is twice that of the first ramp signal, wherein the assertion of the third ramp signal is synchronous with the first ramp signal beginning the ramp signal period;

determining whether the third ramp signal has risen to equal the error signal; and asserting a second ramp signal responsive to the expiration of the minimum off-time period following a determination that the third ramp signal has risen to equal the error signal.

18. The method of claim 17, further comprising:

generating a second magnetization signal responsive to a comparison of the second ramp signal to the error signal; and controlling a plurality of four power switches responsive to the first magnetization signal and the second magnetization signal.

19. The method of claim 17, further comprising:

comparing an output voltage for the multi-level buck converter to a reference voltage to generate the error signal.

20. The method of claim 16, wherein asserting the first magnetizing signal comprises setting a first reset-set latch.

* * * * *

UNITED STATES PATENT AND TRADEMARK OFFICE

CERTIFICATE OF CORRECTION

PATENT NO. : 10,998,818 B2
APPLICATION NO. : 16/533691
DATED : May 4, 2021
INVENTOR(S) : John Kesterson et al.

It is certified that error appears in the above-identified patent and that said Letters Patent is hereby corrected as shown below:

In the Claims

In Claim 1, Column 10, Line 25, change “a minimum” to --the minimum--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*